(12) United States Patent
Cui et al.

(10) Patent No.: US 9,651,966 B2
(45) Date of Patent: May 16, 2017

(54) COMPENSATION NETWORK FOR A REGULATOR CIRCUIT

(71) Applicant: STMicroelectronics (China) Investment Co. Ltd, Shanghai (CN)

(72) Inventors: Zhenghao Cui, Beijing (CN); Kun Kun Zheng, Shanghai (CN)

(73) Assignee: STMicroelectronics (China) Investment Co. Ltd, Shanghai (CN)

( * ) Notice: Subject to any disclaimer, the term of this patent is extended or adjusted under 35 U.S.C. 154(b) by 0 days.

(21) Appl. No.: 14/922,670

(22) Filed: Oct. 26, 2015

(65) Prior Publication Data

US 2017/0090494 A1   Mar. 30, 2017

(30) Foreign Application Priority Data

Sep. 30, 2015   (CN) .......................... 2015 1 0641009

(51) Int. Cl.
| | | |
|---|---|---|
| *G05F 1/56* | (2006.01) | |
| *G05F 1/575* | (2006.01) | |
| *H02M 1/00* | (2006.01) | |

(52) U.S. Cl.
CPC .............. *G05F 1/575* (2013.01); *G05F 1/562* (2013.01); *H02M 2001/0009* (2013.01)

(58) Field of Classification Search
None
See application file for complete search history.

(56) References Cited

U.S. PATENT DOCUMENTS

| | | | | |
|---|---|---|---|---|
| 6,556,083 | B2* | 4/2003 | Kadanka | H03F 1/086 330/109 |
| 6,992,520 | B1* | 1/2006 | Herbert | H03K 17/04123 257/E29.027 |
| 8,816,658 | B1* | 8/2014 | De Vita | G05F 1/575 323/275 |
| 2007/0241730 | A1* | 10/2007 | Dow | G05F 1/575 323/280 |
| 2010/0066320 | A1* | 3/2010 | Dasgupta | G05F 1/56 323/273 |
| 2012/0038332 | A1* | 2/2012 | Lin | G05F 1/575 323/277 |

* cited by examiner

*Primary Examiner* — Jeffrey Gblende
(74) *Attorney, Agent, or Firm* — Gardere Wynne Sewell LLP

(57) ABSTRACT

A linear regulator includes a drive circuit having an input and an output, with the output configured to drive a control terminal of a power transistor for the delivery of a load current. An error amplifier functions to amplify a difference between a reference signal and a feedback signal to generate an error signal at the input of the drive circuit. A compensation circuit includes a series circuit formed by a compensation capacitor and a variable resistance circuit, where the series circuit is coupled to the input of the drive circuit. A current sensing circuit operates to sense the load current. The resistance of the variable resistance circuit is varied in response to the sensed load current.

15 Claims, 4 Drawing Sheets

US 9,651,966 B2

COMPENSATION NETWORK FOR A REGULATOR CIRCUIT

PRIORITY CLAIM

This application claims priority from Chinese Application for Patent No. 201510641009.5 filed Sep. 30, 2015, the disclosure of which is incorporated by reference.

TECHNICAL FIELD

The present invention relates to regulator circuits and, in particular, to a regulator circuit including a compensation network for providing constant bandwidth over a large range of load current.

BACKGROUND

Reference is made FIG. 1 showing a conventional regulator circuit 10. The circuit 10 includes a power transistor 12 having a first conduction terminal coupled to a voltage supply node (Vin) and a second conduction terminal coupled to an output node (Vout). The power transistor 12 may comprise either an n-channel MOSFET device (where the first conduction terminal is the drain node and the second conduction terminal is the source node) or a p-channel MOSFET device (where the first conduction terminal is the source node and the second conduction terminal is the drain node). A control terminal of the power transistor (for example, the gate node of the MOSFET device) is driven with a gate voltage Vgate by the output of a unity gate voltage buffer circuit 14. An input of the buffer circuit 14 is coupled to the output of an error amplifier circuit 16 which generates an error signal Vc. The error amplifier circuit 16 may, for example, comprise a differential amplifier (such as an OP-AMP) having a first input coupled to receive a reference voltage (Vref) and a second input coupled to receive a feedback voltage (Vfb). In the implementation using an n-channel power transistor 12, the first input is the non-inverting input of the amplifier circuit 16 and the second input is the inverting input. Conversely, in the implementation using a p-channel power transistor 12, the first input is the inverting input of the amplifier circuit 16 and the second input is the non-inverting input. A feedback circuit network 18 is coupled between the output node Vout and the second input of the amplifier circuit 16. The feedback circuit network 18 may, for example, comprise a resistive divider circuit formed by series connected resistors R1 and R2.

The circuit 10 takes advantage of negative feedback to obtain a stable voltage output (Vout) for the load (LOAD) over a certain output current range. A load capacitor 20 is provided at the output node Vout to reduce the output noise and improve transient response. It is not difficult to compensate the negative feedback stability for a selected output capacitor over small load current range. However, it is difficult to obtain the compensation if the load current varies over a large range. In application, the load current may significantly over different operating scenarios. The load current may vary from tens of milliamperes to several amperes during normal operation, while during a low power standby mode, the load current may be as low as several microamperes. The circuit 10 of FIG. 1 is not capable of operating over such a range of load current.

To provide for greater flexibility in application, there is a need in the art for an improved regulator circuit that is capable of handling a large range of load current.

SUMMARY

In an embodiment, a circuit comprises: a control circuit for a linear regulator comprising a drive circuit having an input and an output, said output configured to drive a control terminal of a power transistor for the delivery of a load current, said control circuit further comprising an error amplifier configured to amplify a difference between a reference signal and a feedback signal to generate an error signal at the input of the drive circuit; and a compensation circuit comprising: a series circuit formed by a compensation capacitor and a variable resistance circuit, said series circuit coupled to the input of the drive circuit; and a current sensing circuit configured to sense the load current and vary a resistance of the variable resistance circuit in response to the sensed load current.

In an embodiment, a circuit comprises: a drive circuit having an input and an output, said output configured to drive a control terminal of a power transistor for the delivery of a load current; and a compensation circuit comprising: a compensation capacitor; a variable resistance circuit coupled in series with the compensation capacitor to form a series circuit coupled to the input of the drive circuit; and a current sensing circuit configured to sense the load current and vary a resistance of the variable resistance circuit in response to the sensed load current.

In an embodiment, a method comprises: driving a power transistor in response to a control signal to deliver a load current; sensing the load current; and compensating said control signal by varying a resistance of a compensation resistor as a function of the sensed load current.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
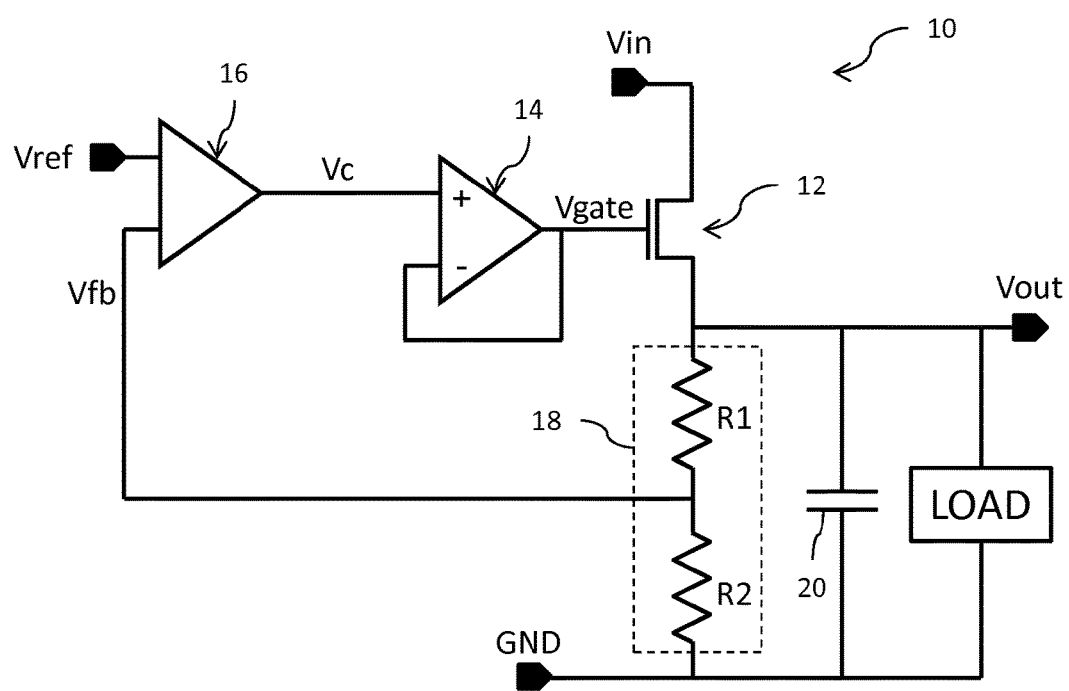
FIG. 1 is a circuit diagram for a conventional regulator circuit.
Figure 2:
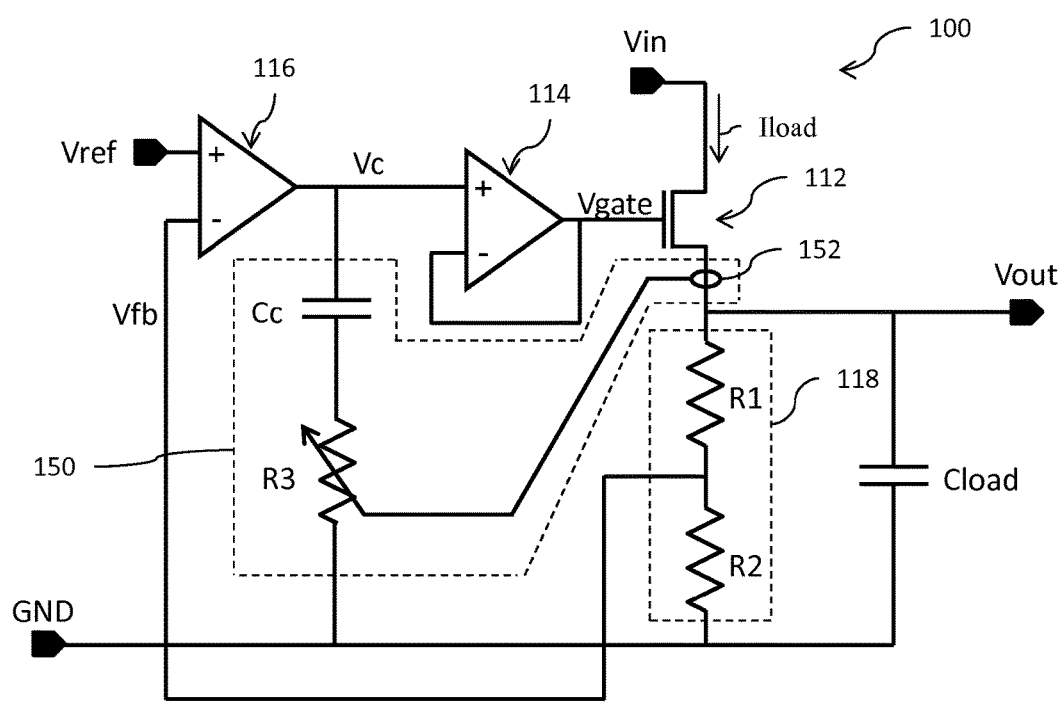
FIG. 2 is a circuit diagram for an embodiment of a regulator circuit including a compensation network.

Reference is now made to FIG. 2 showing an embodiment of a regulator circuit 100. The circuit 100 includes a power transistor 112 having a first conduction terminal coupled to a voltage supply node (Vin) and a second conduction terminal coupled to an output node (Vout). The power transistor 112 may comprise either an n-channel MOSFET device (where the first conduction terminal is the drain node and the second conduction terminal is the source node) or a p-channel MOSFET device (where the first conduction terminal is the source node and the second conduction terminal is the drain node). A control terminal of the power transistor (for example, the gate node of the MOSFET device) is driven with a voltage Vgate by the output of a unity gate voltage buffer circuit 114. An input of the buffer circuit 114 is coupled to the output of an error amplifier circuit 116 that generates an error signal Vc. The error amplifier circuit 116 may, for example, comprise a differential amplifier (such as an OP-AMP) having a first input coupled to receive a reference voltage (Vref) and a second input coupled to receive a feedback voltage (Vfb). In the implementation using an n-channel power transistor 112, the first input is the non-inverting input of the amplifier circuit 116 and the second input is the inverting input. Conversely, in the implementation using a p-channel power transistor 112, the first input is the inverting input of the amplifier circuit 116 and the second input is the non-inverting input. A feedback circuit network 118 is coupled between the output node Vout and the second input of the amplifier circuit 116. The feedback circuit network 118 may, for example, comprise a resistive divider circuit.

The circuit 100 further includes a compensation network 150. The network 150 includes a current sensing circuit 152 coupled to sense the load current (Iload) flowing through power transistor 112 to the load connected at the output Vout. The network 150 further includes a compensation capacitor Cc coupled in series with a variable compensation resistor R3 between the non-inverting input of the unity gate voltage buffer circuit 114 and the ground reference supply node (GND). Control over the variable resistance of the resistor R3 is made in response to the load current Iload sensed by the current sensing circuit 152.

Figure 3:
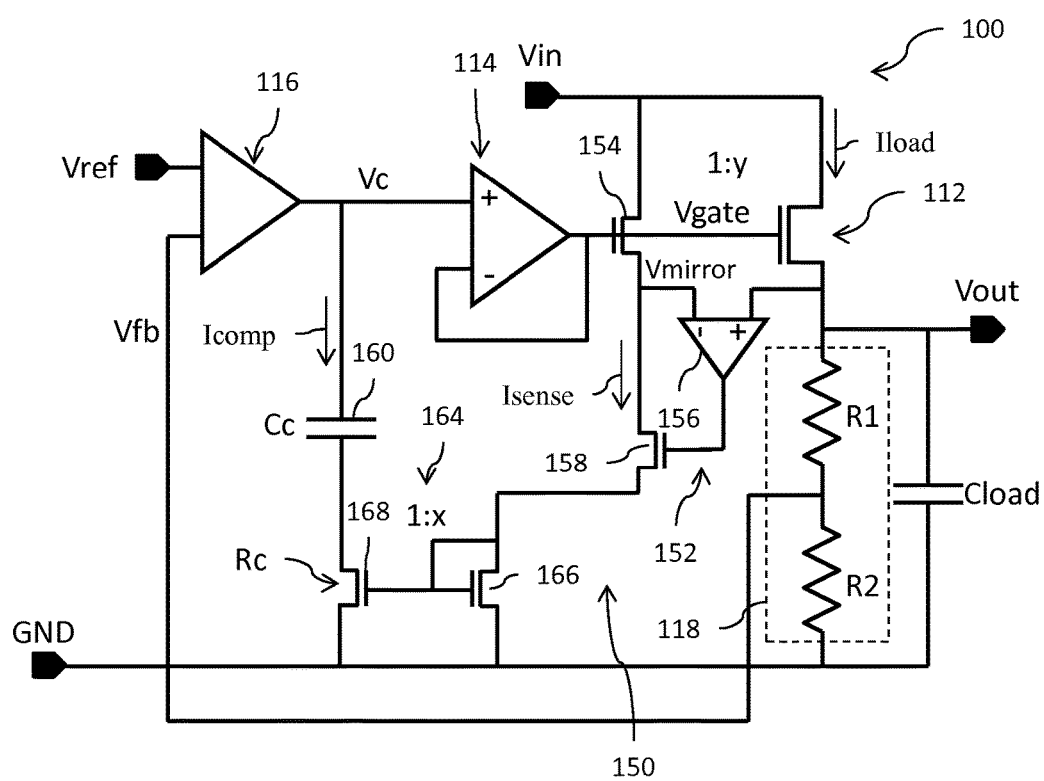
FIG. 3 is a circuit diagram for a compensation network used in the circuit of FIG. 2.

Reference is now made to FIG. 3 showing details of an embodiment for a circuit implementation for the compensation network 150. The current sensing circuit 152 is coupled to sense the load current (Iload) flowing through power transistor 112 to the load connected at the output Vout and output a sensed current (Isense) that is a fraction (1/y) of the magnitude of the load current Iload. The current sensing circuit 152 comprises a sense transistor 154 having a first conduction terminal coupled to the voltage supply node (Vin) and a second conduction terminal. The sense transistor 154 is an n-channel MOSFET device (where the first conduction terminal is the drain node and the second conduction terminal is the source node) if the power transistor 112 is an n-channel device; or is a p-channel MOSFET device (where the first conduction terminal is the source node and the second conduction terminal is the drain node) if the power transistor 112 is a p-channel device. A control terminal of the sense transistor 154 (for example, the gate node of the MOSFET device) is connected to the control terminal of the power transistor 112. The sense transistor 154 is a 1:y scaled replica of the power transistor 112.

The current sensing circuit 152 further comprises a regulating circuit formed by differential amplifier 156 and transistor 158. The non-inverting input of the amplifier 156 is connected to receive the voltage at the output node (Vout). The inverting input of the amplifier 156 is connected to second conduction terminal of the sense transistor 154 to receive a voltage Vmirror. The transistor 158 has its source-drain path connected in series with the source-drain path of the sense transistor 154. The gate of transistor 158 is connected to the output of the amplifier 156. The regulating circuit operates to force the voltage Vmirror to equal to the voltage Vout. When this occurs, the power transistor 112 and sense transistor 154 have the same source voltage, gate voltage and drain voltage. The current Isense flowing through transistors 154 and 158 is thus a fraction of the load current flowing through the power transistor 112, that fraction being set by the 1:y ratio of the sense transistor to the power transistor (i.e., Isense=Iload/y).

The sensed current Isense is applied to the input of a current mirror circuit 164 formed by transistor 166 and transistor 168. The transistors 166 and 168 are n-channel MOSFET devices where transistor 168 is x times smaller than transistor 166 (i.e., the transistors are replicas with a 1:x scale ratio). A current conduction path of transistor 168 is connected in series with a compensation capacitor 160. The current mirror circuit 164 accordingly outputs a compensation current (Icomp) that is a fraction (1/x) of the sensed current Isense, and more particularly a fraction (1/(yx)) of the load current Iload. The source terminals of transistors 166 and 168 are coupled to the ground node and the gate terminals of transistors 166 and 168 are coupled together and to the drain terminal of transistor 166 at the input of the current mirror circuit 164. The drain terminal of transistor 168 is at the output of the current mirror circuit 164 to provide the compensation current Icomp. The compensation capacitor 160 has a capacitance Cc is connected between the output of the current mirror circuit 164 and the non-inverting input of the unity gate voltage buffer circuit 114.

In an embodiment, the error amplifier circuit 116 is an operational transconductance amplifier (OTA) having a transconductance of gm1. This circuit 116 is the first stage of the feedback loop for the regulator 100. At the input is the voltage difference between the reference voltage Vref and the feedback voltage Vfb.

The unity gate voltage buffer circuit 114 is formed by an amplifier circuit having a transconductance of gm2.

The power transistor 112 has a transconductance of gm3 and a gate capacitance of Cgate. The size of transistor 112 is defined by the ratio of its width and length (Wp/Lp).

The transistor 166 has a transconductance of gm4. The size of transistor 166 is defined by the ratio of its width and length (Wn/Ln).

The size of transistor 168 is defined by the ratio of its width and length (Wm/Lm).

Transistor 168 functions as a variable resistor (FIG. 2, R3) connected in series with the compensation capacitor 160. The drain-to-source resistance (Rc) of transistor 168 is set by the gate-to-source voltage (Vgs) of transistor 168. The Vgs of transistor 168 is equal to the Vgs of transistor 166. The Vgs of transistor 166 is set by the size of transistor 166 and the current Isense flowing from the drain-to-source of transistor 166. Thus, the value of the resistance Rc of transistor 168 varies as a function of change in the load current Iload because Isense=Iload/y.

The values of gm1, gm2, gm3 and Cc are fixed values in the design once the design is closed.

The value of Rc, however, changes with the value of gm4, and gm4 changes with Isense which changes with Iload. So, the value of Rc changes with Iload.

Rc is the resistance between drain and source of transistor 168. Transistor 168 works in the triode region. Thus, $$Rc = \frac{Id_{M168}}{Vds_{M168}} = \frac{1}{K'_n * \frac{W_m}{L_m} * (Vgs_{M168} - Vth_{M168})}$$

Where M166 and M168 refer to transistors 166 and 168, respectively.

$$gm4 = K'_n * \frac{W_n}{L_n} * (Vgs_{M166} - Vth_{M166}) = \sqrt{2 * Id_{M166} * K'_n * \frac{W_n}{L_n}}$$

Since $\frac{\frac{W_n}{L_n}}{\frac{W_m}{L_m}} = x$ and $(Vgs_{M168} - Vth_{M168}) = (Vgs_{M166} - Vth_{M166})$, then $$Rc = \frac{x}{gm4} = \frac{x}{\sqrt{2 * Id_{M166} * K'_n * \frac{W_n}{L_n}}} =$$

$$\frac{x}{\sqrt{2 * I1 * K'_n * \frac{W_n}{L_n}}} = \frac{x}{\sqrt{2 * \frac{Iload}{y} * K'_n * \frac{W_n}{L_n}}}$$

Thus, the transconductance gm3 changes with Iload.

$$gm3 = \sqrt{2 * Iload * K'_p * \frac{W_p}{L_p}}$$

Assume that the feedback is unit feedback which is the worst case for stability compensation. There are three poles and one zero in the feedback loop. There is a first pole P1 at the Vc node. There is a second pole P2 at the Vgate node. There is a third pole P3 at the Vout node. There is a zero Z1 at the Vc node.

Figure 4A:
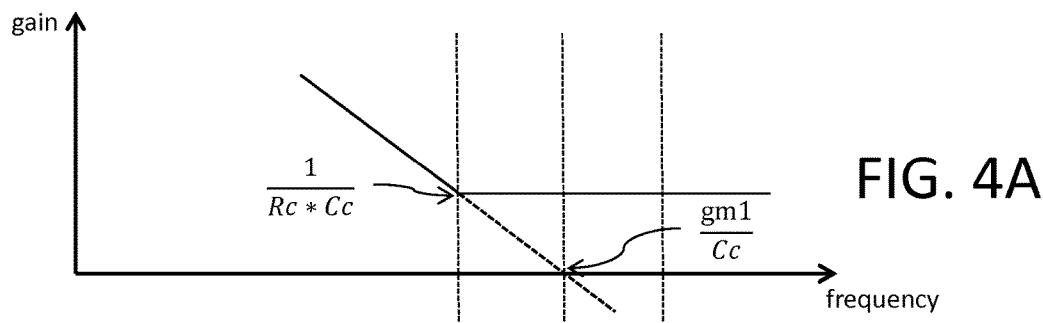
FIGS. 4A-4C are Bode plots for stability analysis of the regulator circuits of FIGS. 2 and 3.
Figure 4B:
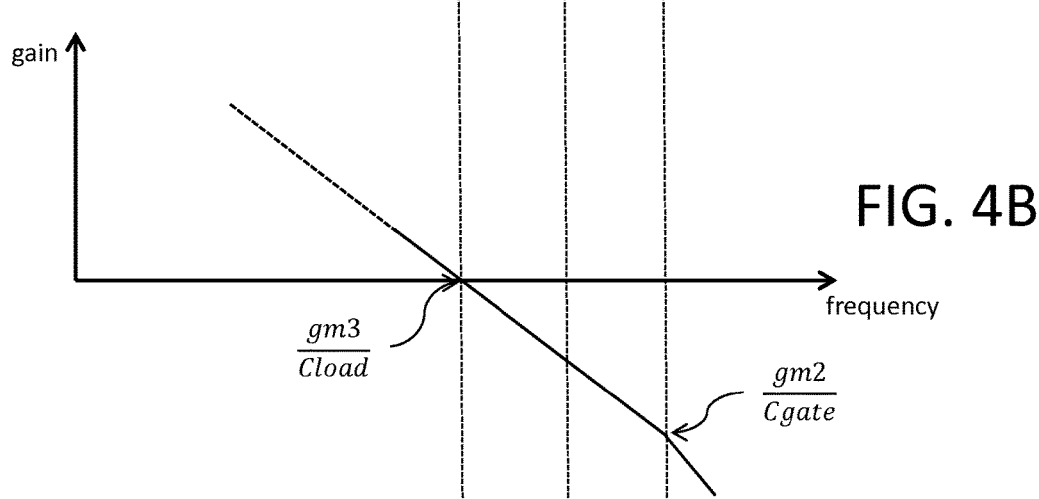
Figure 4C:
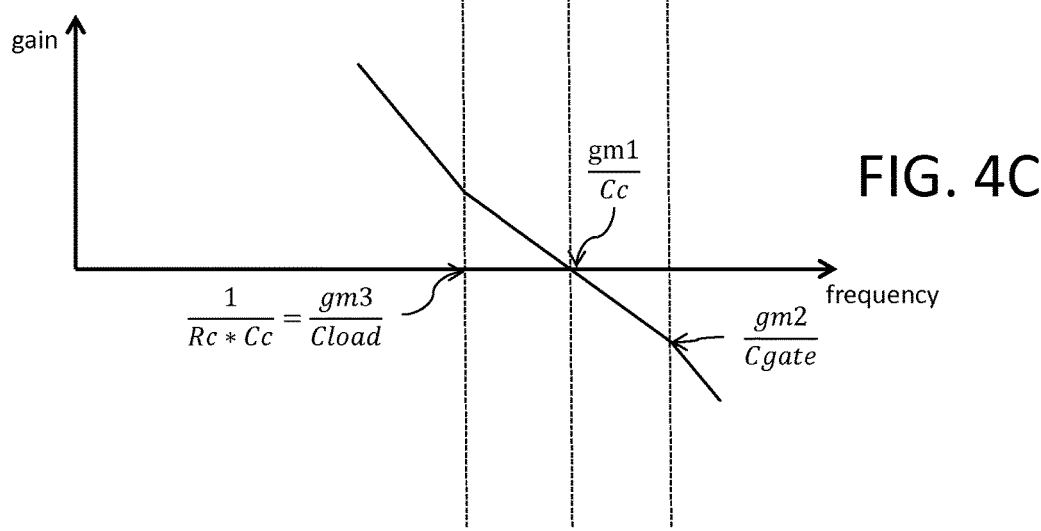

FIGS. 4A-4C show three Bode plots for the stability analysis. FIG. 4A is the Bode plote plot from node Vfb to node Vc. FIG. 4B is the bode plot from node Vc to node Vout. FIG. 4C is the Bode plot of the negative feedback loop.

In the FIG. 4A Bode plot, there is one pole and one zero. The unit gain bandwidth without the zero is gm1/Cc, the zero is at $$\frac{1}{Rc * Cc}.$$

The value of gm1/Cc is fixed once the design is closed. The value of $$\frac{1}{Rc * Cc}$$

changes with the load current.

In the FIG. 4B Bode plot, the unit gain bandwidth is at gm3/Cload. The second pole is at gm2/Cgate. The values of gm3 and gm2 are all changing with Iload.

If we make the unit gain bandwidth of Vout/Vc bode plot instead at the frequency of the zero of Vc/Vfb Bode plot, the Bode plot of the feedback loop will be as shown in FIG. 4C. There are three poles and one zero. The frequency of the zero is $$\frac{1}{Rc * Cc}$$

or gm3/Cload, the same frequency. The unit gain bandwidth is at gm/Cc. It is also needed to guarantee that gm2/Cgate is at a higher frequency than gm1/Cc. Then, with selected load capacitance the unit gain bandwidth of the regulation loop is a constant value, independent of load current.

$$\frac{1}{Rc * Cc} = \frac{gm3}{Cload}$$

$$\frac{gm4}{x * gm3} = \frac{Cc}{Cload}$$

$$\frac{\sqrt{2 * \frac{Iload}{y} * K'_n * \frac{W_n}{L_n}}}{x * \sqrt{2 * Iload * K'_p * \frac{W_p}{L_p}}} = \frac{Cc}{Cload}$$

$$\frac{2 * \frac{Iload}{y} * K'_n * \frac{W_n}{L_n}}{x^2 * 2 * Iload * K'_p * \frac{W_p}{L_p}} = \left(\frac{Cc}{Cload}\right)^2$$

$$\frac{K'_n * \frac{W_n}{L_n}}{x^2 * y * K'_p * \frac{W_p}{L_p}} = \left(\frac{Cc}{Cload}\right)^2$$

$$x^2 * y = \frac{K'_n * \frac{W_n}{L_n}}{K'_p * \frac{W_p}{L_p}} * \left(\frac{Cload}{Cc}\right)^2$$

To simplify the calculation, assume x=1. Then, a simplification:

$$y = \frac{K'_n * \frac{W_n}{L_n}}{K'_p * \frac{W_p}{L_p}} * \left(\frac{Cload}{Cc}\right)^2$$

So, if the sense ratio 1:y of the current sense circuit meets the equation above, and gm2/Cgate is at a higher frequency than gm1/Cc, the unit gain bandwidth of the regulator is always gm1/Cc, and is thus independent of the load current. Within the bandwidth gm1/Cc, there are two poles and one zero. The phase margin of the feedback loop should be acceptable. The system stability is independent of the load current.

The foregoing analysis assumes a p-channel MOSFET for the power transistor 112. As discussed, the power transistor 112 may alternatively comprise an n-channel device. In such a case, the input polarity is changed on gm1 for the error amplifier 116. The calculations will be nearly the same as those provided above, except as shown below:

$$y = \frac{K'_n * \frac{W_n}{L_n}}{K'_p * \frac{W_p}{L_p}} * \left(\frac{Cload}{Cc}\right)^2$$

Since transistors 112, 166 and 168 are all N type, we have:

$$K'_n = K'_p$$

So, $$y = \frac{\frac{W_n}{L_n}}{\frac{W_p}{L_p}} * \left(\frac{Cload}{Cc}\right)^2$$

Again, if the sense ratio 1:y of the current sense circuit meets the equation above, and gm2/Cgate is at a higher frequency than gm1/Cc, the unit gain bandwidth of the regulator is always gm1/Cc, and is thus independent of the load current. Within the bandwidth gm1/Cc, there are two poles and one zero. The phase margin of the feedback loop should be acceptable. The system stability is independent of the load current.

The foregoing description has been provided by way of exemplary and non-limiting examples of a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
    a control circuit for a linear regulator comprising a drive circuit having an input and an output, said output configured to drive a control terminal of a power transistor for the delivery of a load current, said control circuit further comprising an error amplifier configured to amplify a difference between a reference signal and a feedback signal to generate an error signal at the input of the drive circuit;
    a load capacitor coupled to an output of the power transistor; and
    a compensation circuit comprising:
        a series circuit formed by a compensation capacitor and a variable resistance circuit, said series circuit coupled to the input of the drive circuit; and
        a current sensing circuit configured to sense the load current and vary a resistance of the variable resistance circuit in response to the sensed load current,
    wherein the current sense circuit is further configured to generate a sense current that is a fraction of the load current, and
    wherein said fraction has a value that is set dependent on a ratio of a capacitance of the load capacitor to a capacitance of the compensation capacitor.

2. The circuit of claim 1, wherein said variable resistance circuit comprises a transistor having a current conduction path coupled in series with said compensation capacitor and a control terminal coupled to an output of the current sensing circuit.

3. The circuit of claim 2, wherein said transistor is a circuit component of a current mirror circuit.

4. The circuit of claim 3, wherein said current mirror circuit has an input configured to receive said sense current.

5. The circuit of claim 1, wherein said current sense circuit comprises a sense transistor having a control terminal coupled to the output of the driver circuit, said sense transistor having a conduction terminal configured to output said sense current.

6. The circuit of claim 5, wherein said current sense circuit comprises a regulator circuit configured to force a voltage at the conduction terminal of the sense transistor to equal a voltage at a corresponding conduction terminal of the power transistor.

7. The circuit of claim 6, wherein said regulator circuit comprises:
    a differential amplifier having a first input the conduction terminal of the sense transistor and a second input coupled to the corresponding conduction terminal of the power transistor; and
    a regulator transistor having a conduction path coupled in series with a conduction path of the sense transistor and having a control terminal coupled to an output of the differential amplifier.

8. The circuit of claim 1, further comprising a feedback circuit coupled an output of the power transistor, said feedback circuit configured to generate said feedback signal.

9. A circuit, comprising:
    a drive circuit having an input and an output, said output configured to drive a control terminal of a power transistor for the delivery of a load current to a load capacitor coupled to an output of the power transistor; and
    a compensation circuit comprising:
        a compensation capacitor;
        a variable resistance circuit coupled in series with the compensation capacitor to form a series circuit coupled to the input of the drive circuit; and
        a current sensing circuit configured to sense the load current and vary a resistance of the variable resistance circuit in response to the sensed load current, wherein said current sensing circuit is configured to generate a sense current, and wherein said sense current is a fraction of the load current; and
        wherein said fraction has a value that is set dependent on a ratio of a capacitance of the load capacitor to a capacitance of the compensation capacitor.

10. The circuit of claim 9, where said variable resistance circuit comprises a transistor having a current conduction path coupled in series with said compensation capacitor and a control terminal coupled to an output of the current sensing circuit.

11. The circuit of claim 10, wherein said control terminal of the transistor is coupled to receive said sensed current.

12. A method, comprising:
    driving a power transistor in response to a control signal to deliver a load current to a load capacitor coupled to an output of the power transistor;
    sensing the load current;
    generating a sense current that is a fraction of the sensed load current; and
    compensating said control signal by varying a resistance of a compensation resistor as a function of the sensed load current, wherein compensating comprises using said sense current to control varying the resistance of the compensation resistor, and
    wherein said fraction has a value that is set dependent on a ratio of a capacitance of the load capacitor to a capacitance of a compensation capacitor coupled in series with compensation resistor.

13. The method of claim 12, further comprising generating said control signal as a function of a feedback signal, wherein compensating comprises compensating for said feedback signal.

14. The method of claim 12, wherein varying the resistance of the compensation resistor comprises varying conduction of a transistor device forming said compensation resistor.

15. The method of claim 14, further comprising using said sense current to control conduction of the transistor device.

* * * * *